United States Patent [19]
Yajima

[11] Patent Number: 4,715,114
[45] Date of Patent: Dec. 29, 1987

[54] TENSION SPRING TAKEOUT DEVICE IN AN AUTOMATIC TENSION SPRING MOUNTING APPARATUS

[75] Inventor: Yutaka Yajima, Akishima, Japan
[73] Assignee: Tachi-S Co., Ltd., Tokyo, Japan
[21] Appl. No.: 939,068
[22] Filed: Dec. 8, 1986
[51] Int. Cl.[4] .......................... B23Q 7/10; B23P 19/04
[52] U.S. Cl. ...................................... 29/809; 29/227; 198/430; 414/225; 414/783
[58] Field of Search ................. 29/173, 809, 701, 225, 29/227, 456; 294/87.1; 414/222, 225, 226, 783; 198/953, 430; 267/112, 111, 110; 297/455, 456

[56] References Cited
U.S. PATENT DOCUMENTS
4,653,185 3/1987 Kajima et al. .................... 29/227 X Primary Examiner—Mark Rosenbaum
Assistant Examiner—Frances Chin
Attorney, Agent, or Firm—Oldham, Oldham & Weber Co.

[57] ABSTRACT

A tension spring takeout device for use in an automatic tension spring mounting apparatus for automatically mounting tension springs for mounting a pad receive member to a seat frame forming an automotive seat. The tension spring takeout device comprises a stock mechanism into which the tension springs are discharged from a part feeder having a separation mechanism for separation of the tension springs that are successively supplied, and which are arranged in a line and stocked; a takeout mechanism comprising a predetermined number of takeout means located in the stock mechanism so as to correspond to the mounting intervals of the tension springs to the seat frame and operable to push out a predetermined number of tension springs simultaneously; and a transfer device adapted to catch the tension springs pushed out by the takeout means of the takeout mechanism as well as to transfer and mount the tension springs to the mounting portions of the seat frame.

11 Claims, 12 Drawing Figures

TENSION SPRING TAKEOUT DEVICE IN AN AUTOMATIC TENSION SPRING MOUNTING APPARATUS

BACKGROUND OF THE INVENTION

1. Field of the Invention

The present invention relates to a tension spring takeout device in an apparatus for automatically mounting a plurality of tension springs which are used to spread a pad receive member over a seat frame in an automotive seat.

2. Description of the Prior Art

In the prior art, as a typical example of cushion structures for use in vehicle seat, there is known such a cushion structure as disclosed in Japanese Utility Model Publication No. 5,882 of 1972.

Specifically, in the disclosed cushion structure, as shown in FIG. 1, a plurality of wires (3) are stretched between two side members (2a), (2b) and a separation member (4) is inserted between the thus stretched wires (3) to form a so-called screen-shaped pad receive member (5); and, the pad receive member (5) is then resiliently spread between the front and rear frames (1a), (1b) of a seat frame (1) on the two sides thereof by means of tension springs S, which resiliency can provide a comfortable cushion effect.

The illustrated seat frame (1) is a so-called bench seat frame including two pad receive members (5) which are spread or located symmetrically in the right and left portions thereof. In this seat frame (1), in consideration of resilient touch provided when an occupant is seated thereon, the tension springs are mounted at different intervals.

To mount the tension springs S of each of the pad receive members (5) in the seat frame (1), one of the end hooks formed symmetrically on the two ends of the tension spring S is secured to a side element of the pad receive member (5), the other end hook is inserted into an engagement hole (6) formed in the seat frame (1); and, in this manner, a required number of tension springs S are secured sequentially to either the front or rear frames (1a), (1b) of the seat frame (1) from one side thereof, and then similarly a required number of tension springs S are secured to the other of the front or rear frames.

The above-mentioned operation for mounting the tension springs S of the pad receive members (5) in the seat frame (1) has been performed by means of a manual operation, for the most part, in the prior art. This manual operation has required much labor and has been not efficient.

In order to avoid such disadvantages found in the conventional manual mounting operation, recently, there has been proposed an automatic tension spring mounting apparatus which is capable of automatically mounting tension springs using an industrial robot.

However, since the conventional automatic tension spring mounting apparatus of this type is arranged such that the tension springs are supplied and mounted one by one to their mounting portions, it requires almost the same mounting time as in the manual operation, and, therefore, the working efficiency of the automatic apparatus cannot be improved so greatly.

SUMMARY OF THE INVENTION

The present invention aims at eliminating the drawbacks found in the above-mentioned conventional automatic tension spring mounting apparatus.

Accordingly, it is an object of the invention to provide a tension spring takeout device which is capable of taking out and mounting a predetermined number of tension springs simultaneously so as to be able to reduce the time for mounting the tension springs.

To accomplish the above object, according to the invention, there is provided a tension spring takeout device which comprises a supply chute serving as a stock mechanism into which tension springs discharged from a part feeder provided with a separation mechanism to separate the tension springs from one another are successively supplied and stocked in line; a takeout mechanism which includes a predetermined number of takeout means formed in the successive supply portion or horizontal portion of the supply chute and respectively located correspondingly to the mounting distances of the tension springs with respect to a seat frame and which is operable such that a predetermined number of tension springs can be pushed out simultaneously; and, a tranfer device which catches the tension springs pushed out from the takeout mechanism and transfers them to the mounting portion of the seat frame for mounting them thereto.

Accordingly, the tension springs discharged from the part feeder are delivered to the horizontal portion of the supply chute serving as the stock mechanism, and are arranged in line in a transverse direction for stocking. And, when the tension springs are stocked in this manner, then the takeout mechanism is operated so that a predetermined number of tension springs are pushed out simultaneously, that is, the predetermined number of tension springs are simultaneously taken out at predetermined intervals by the takeout means. When the predetermined number of tension springs are taken out in this manner, then the transfer device is operated so that the tension springs taken out by the takeout mechanism are simultaneously caught and are then transferred and mounted to the mounting portion of the seat frame.

For this reason, according to the invention, the time necessary to mount the tension springs can be reduced when compared with the prior art devices, resulting in the improved efficiency of the mounting operation.

Many other features, advantages and additional objects of the present invention will become manifest to those versed in the art upon making reference to the detailed description which follows and the accompanying drawings.

DETAILED DESCRIPTION OF A PREFERRED EMBODIMENT OF THE INVENTION

Figure 1:
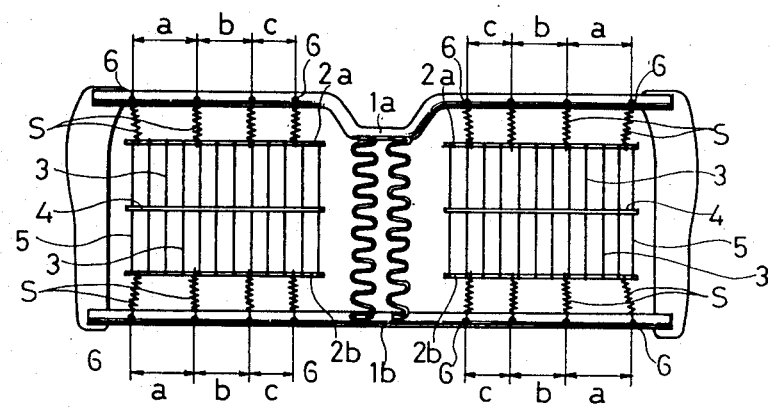
FIG. 1 is a plan view of a seat frame of an automotive seat including a pair of pad receive members each of which is spread by tension springs.
Figure 2:
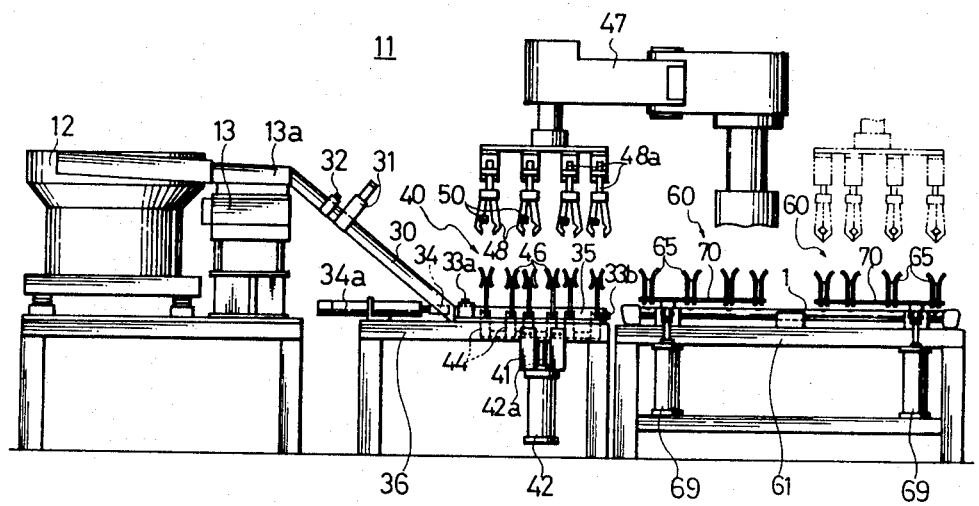
FIG. 2 is a front view of an automatic tension spring mounting device into which the present invention is applied.

In FIG. 2, reference numeral (11) designates an entire automatic tension spring mounting device which includes a pair of pad receive members (5) both spread over a seat frame (1) as shown in FIG. 1, and (12) represents a part feeder to supply tension springs S. The part feeder (12) is provided with a separation mechanism for the tension springs S so that a large number of tension springs S input to the part feeder (12) can be separated from one another and sent out into a linear feeder (13).

Figure 3:
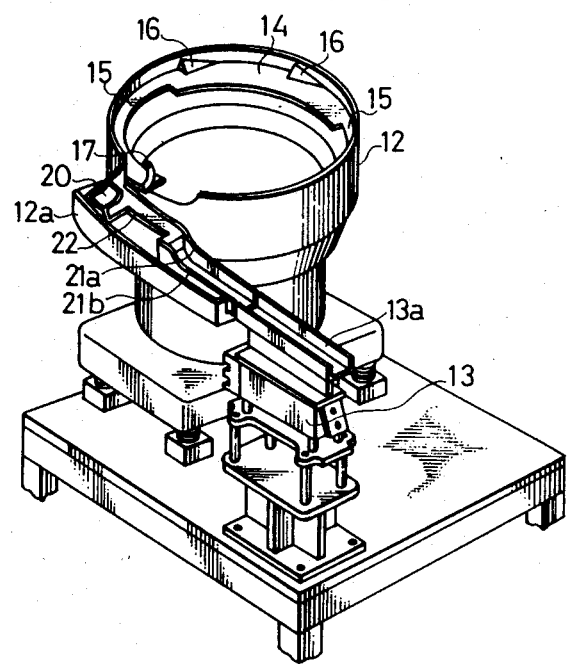
FIG. 3 is a perspective view of a part feeder.
Figure 4:
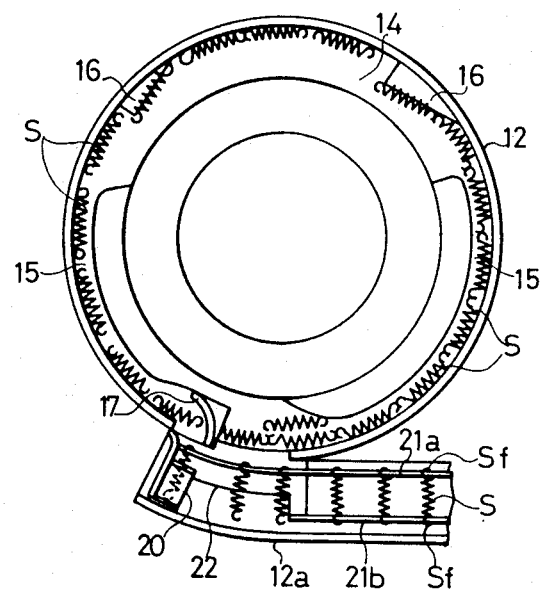
FIG. 4 is a plan view of the above part feeder.

FIGS. 3 and 4 are perspective and plan views of the above-mentioned part feeder (12), respectively. The part feeder (12) is formed in the internal peripheral surface thereof with a feed passage (14) which extends spirally from the bottom portion thereof to the upper surface opening portion thereof, so that, when the part feeder (12) is vibrated, then the tension springs S can be moved through the feed passage (14) along the inner side wall thereof. In the feed passage (14), there are formed two narrow-width portions (15) each of which has a width substantially equal to the outside diameter of the tension spring S. Also, the feed passage (14) is equipped with two inclined projections (16) extending over the inside wall of the part feeder (12) and the upper surface of the feed passage (14), each of the projections (16) providing a level difference which is slightly greater than the outside diameter of the tension spring S.

When a large number of tension springs S are input into the thus constructed part feeder (12) and the part feeder (12) is caused to vibrate, then the tension springs S can be transferred successively in the longitudinal direction thereof along the feed passage (14) from the bottom portion of the part feeder (12) toward the upper surface opening portion of the part feeder (12). Due to the fact that the width of each of the narrow-width portions (15) is defined to be equal to the width of 1 piece of tension spring S, when the tension springs S pass through the narrow-width portion (15), the tension springs S that overrun the narrow-width portion (15) are caused to fall down onto the bottom portion of the part feeder (12), with the result that the tension springs S can be arranged in a line.

Then, when the thus lined tension springs S pass through the projection (16), the end hooks Sf of the two adjacent tension springs S can be disentangled from each other, when they are entangled. In other words, when the two adjacent tension springs S with the respective end hooks Sf thereof being entangled with each other override and pass through the projection (16), the tension spring S that has passed earlier than the other is caused to shift with respect to the following tension spring S due to the level difference of the projection (16), so that the respective end hooks Sf of the two tension springs S are separated from each other, that is, the entanglement of the two tension springs S is removed.

Such separation of the end hooks Sf of the tension springs S is carried out at the two projections (16). The thus separated tension springs S are then abutted against an abutment guide member (17) provided in the end portion of the feed passage (14) and are rotated along the arc-shaped surface of the abutment guide member (17) to turn their directions to the outside. As a result of this, the tension springs S are finally separated from one another and the direction-turned tension springs S are then caused to fall down from the end portion of the feed passage (14) into a box (20) located correspondingly to the feed passage (14) end portion, when one end hook Sf of the tension spring S is brought into engagement with a rail member (21a). However, in case of the tension springs S with their end hooks Sf remaining still entangled with each other, since the end hooks Sf are not to be engaged with the rail member (21a), the tension springs S drop from a drop portion (22) down to the bottom portion of a receive portion (12a) of the part feeder (12) and are then moved back into the part feeder (12).

And, the tension spring S with one end hook Sf engaged with the rail member (21) and is moved on along the rail member (21a) due to the vibrations of the part feeder (12), and, when it goes beyond the drop portion (22), the other end hook Sf thereof is also brought into engagement with the rail member (21b). Thus, the tension spring S, with the two end hooks Sf engaged with the two rail members (21a) and (21b), is the sent out onto a pair of parallel guides (13a) of the linear feeder (13) which are located in the extended directions of the rail members (21a) and (21b), respectively.

Figure 5:
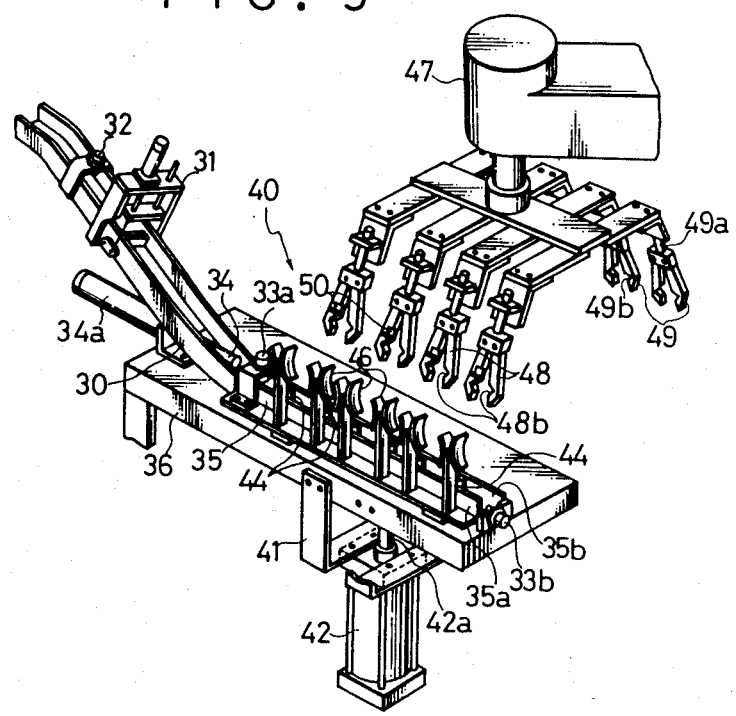
FIG. 5 is a perspective view of a tension spring takeout device constructed in accordance with the invention.

Referring now to FIG. 5, there are shown a stock mechansim, a takeout mechanism (40), and a transfer device (47).

The tension spring S that is sent out onto the linear feeder from the part feeder (12) in the above-mentioned manner is then delivered by means of the vibratory movements of the linear feeder to a supply chute (30) located correspondingly to the front portion of the parallel guides (13a). Further, the tension spring S delivered to the supply chute (30) is once stocked by a delivery device (31) disposed midway in an inclined portion of the supply chute (30). When the number of the tension springs S stocked there reaches a predetermined number, this is sensed by a sensor (32) to thereby put the delivery device (31) into operation, with the result that a predetermined number of tension springs S (4 pieces in this embodiment) are allowed to fall down.

When the tension springs S are dropped down in this manner, then a cylinder (34a) is put into operation by means of sensing of an adjacent switch (33a), with the result that a pushout body (34) pushes out the tension springs S to a horizontal portion, that is, a successive supply portion of the supply chute (30) serving as a stock mechanism and thus the tension springs S are successively supplied and arranged in line in a transverse direction. The horizontal portion (35) of the supply chute (30) is composed of a pair of L-shaped-section rail members (35a), (35b) respectively fixed to a base (36). One rail member (35a) is formed higher and the other rail member (35b) is formed lower, which provides a difference in level between them. For this reason, the tension springs S are stocked in line in the transverse direction at a predetermined angle of inclination since the respective end hooks Sf thereof are engaged in higher and lower positions.

The horizontal portions (35) of the supply chute (30) is equipped with the takeout mechanism (40) which serves to take out a predetermined number of tension springs S.

Figure 6:
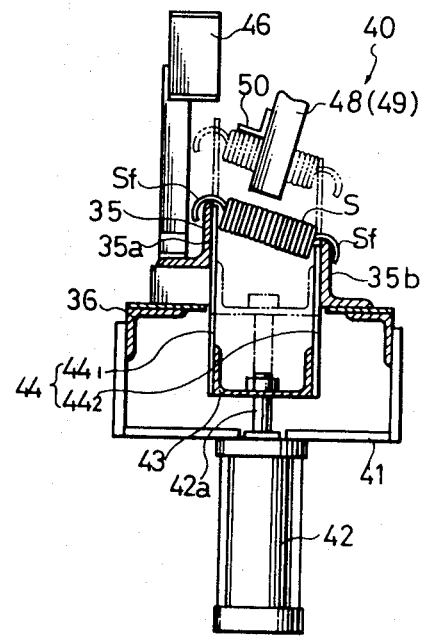
FIG. 6 is a longitudinal side section view of the tension spring takeout device of the invention.

Referring now to FIG. 6, there is shown a longitudinal side section view of the takeout mechanism (40).

Description will be given of the construction of the takeout mechanism (40) in connection with FIGS. 5 and 6. A support bracket (41) is fixed to the both side surfaces of the base (36) in such a manner that it extends across the two base side surfaces downwardly and transversely of the base (36). A cylinder (42) is perpendicularly fixed to the support bracket (41) such that the cylinder (42) is located just below the horizontal portion (35) of the supply chute (30). The cylinder (42) includes a cylinder rod (42a) to the upper end of which is connected a support member (43) having a U-shaped section and also having a length substantially equal to that of the horizontal portion (35) of the supply chute (30). A predetermined number of takeout means (44) [(44a), (44b), (44c), (44d), (44e), (44f)] are mounted perpendicularly to the support member (43).

Figure 7:
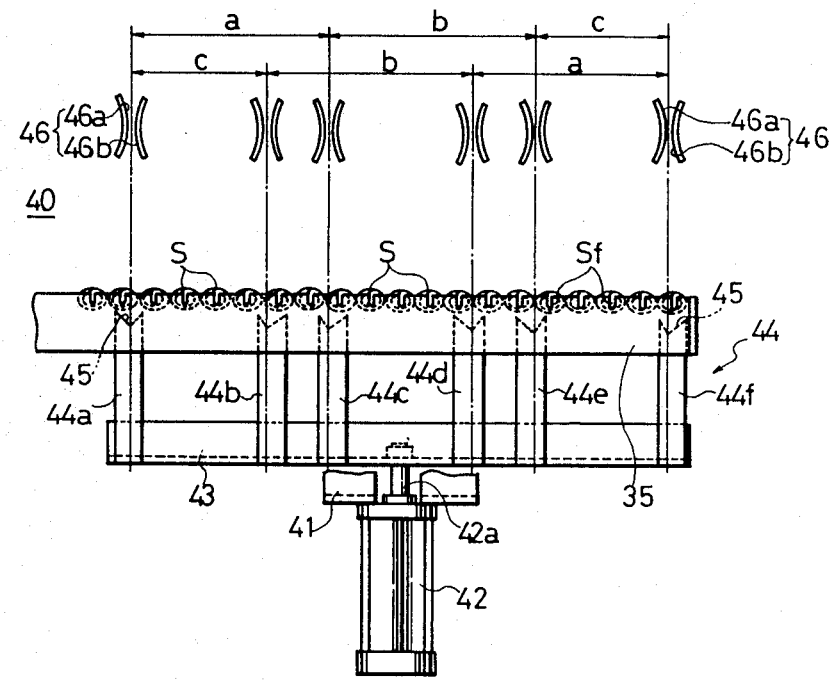
FIG. 7 is a longitudinal front section view of a takeout mechanism portion of the tension spring takeout device of the invention.

Each of the takeout means (44) comprises a pair of claw-piece-shaped members (44$_1$) (44$_2$) respectively located along the respective inside surfaces of the two rail members (35a) (35b) of the horizontal portion (35) of the supply chute (30) in different levels so as to correspond to the two rail members (35a) (35b). The mounting distances between the takeout means (44) are made to correspond to the mounting intervals of the tension springs S in the seat frame (1), that is, the intervals between the engagement holes (6) respectively expressed as a, b, c (FIG. 1). In other words, in the illustrated embodiment, the first takeout means (44a), the third takeout means (44c), the fifth takeout means (44e) and the sixth takeout means (44f) are equal in intervals to the sixth takeout means (44f), the fourth takeout means (44d), the second takeout means (44b) and the first takeout means (44a), respectively, so that they correspond to the intervals a, b, c of the engagement holes (6) in the seat frame (1), respectively (see FIG. 7).

Also, each of the takeout means (44) is formed in the tip end thereof with a cutaway inclined recess (45) the deepest cutaway portion of which is made to correspond accurately to the position of its associated engagement hole (6) in the seat frame (1).

Further, on one side of the horizontal portion (35) of the supply chute (30), there is provided a predetermined number of direction restricting means (46) respectively corresponding to the takeout means (44). Each of the direction restricting means (46) comprises a pair of opposing wall members (46a) (46b) providing a clearance therebetween which is made to correspond to the inclined recess (45) in each of the takeout means (44). The clearance is formed open both in the upper and lower end portions and the central distance thereof is slightly greater than the diameter of the tension spring S.

Figure 8:
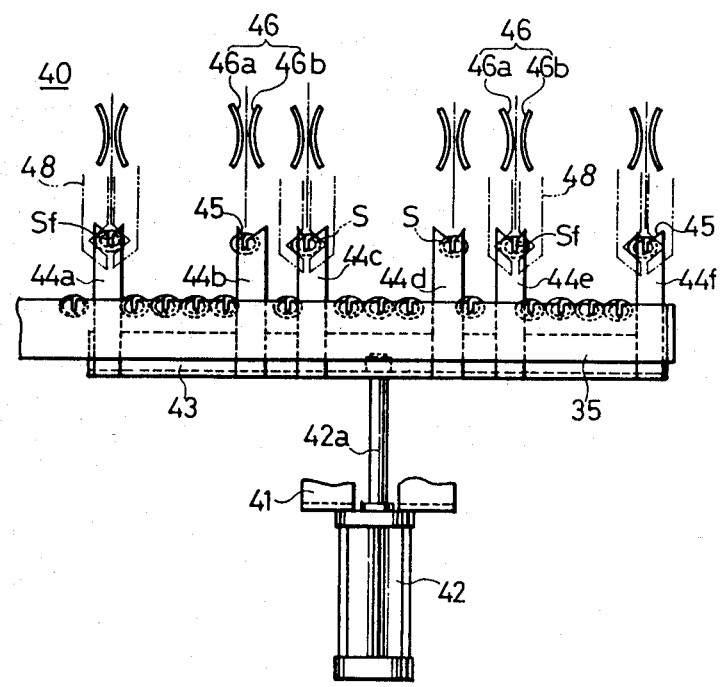
FIG. 8 is a longitudinal front section view of the above takeout mechanism portion, illustrating a state in which the tension springs have been taken out.

In the takeout mechanism (40) constructed in the above-mentioned manner, when the tension springs S are stocked in the horizontal portion (35) of the supply chute (30), then the adjacent switch (33b) senses this to thereby put the cylinder (42) into operation. As a result of this, the takeout means (44) are caused to move up vertically and the two end hooks Sf of each of the tension springs S are brought into engagement with the cutaway deepest portion of the inclined recess (45), whereby a plurality of tension springs S are pushed up from the horizontal portion (35) of the supply chute (30), that is, taken out simultaneously (FIG. 8). Although the tension springs S may individually have different outside diameters, during the takeout operation, due to the fact that the cutaway deepest portion of the inclined recess (45) in the takeout means (44) is made to correspond accurately to the position of the engagement hole (6) in the seat frame (1), the tension springs S can be taken out in such a manner that the end hooks Sf thereof are rectified so as to correspond to any of the intervals a, b, c of the engagement holes (6) in the seat frame (1).

Also, due to the fact that the respective takeout means (44) are formed in a different level way so as to correspond to the horizontal portion (35) of the supply chute (30), the tension springs S are taken out in such a manner that they are maintained inclined at a predetermined angle.

When the tension springs S are taken out by the takeout mechanism (40) in this manner, then the transfer device (47), which is located so as to correspond to the pushout direction of the takeout means (44) of the takeout mechansim (44), is operated to catch the tension springs S and to transfer them to the seat frame (1) placed and fixed to a tension spring mounting apparatus to be described later. As the transfer device (47), an industrial robot is employed. The industrial robot includes a predetermined number of manipulators (48) and (49) (4 manipulators in the illustrated embodiment) located symmetrically on the mutually 180° opposing sides of the tip end portion thereof in such a manner that they can correspond to the intervals a, b, c of the engagement holes (6) in the seat frame (1) respectively. These four manipulators (48) and (49) are opened or closed simultaneously by means of operation of cylinders (48a) and (49a). The manipulators (48) and (49) are also provided on the insides of the tip end portion thereof with grab portions (48b) and (49b) which are used to grab the tension spring S therebetween.

Also, the manipulators (48) and (49) are formed in an inclined manner so as to be able to catch in the intersecting direction the tension springs S that are taken out inclined as mentioned above. Further, to one of grip portions of the respective manipulators there if fixed an L-shaped abutment piece (50) such that it is situated upwardly of the grap portions (48b) and (49b). This abutment piece (50) is used to support the upper face of the tension spring S when it is caught so as to be able to maintain the positive catch condition of the tension spring S in the intersecting direction.

In the transfer device (47), each time the tension springs S are taken out by the above-mentioned takeout mechanism (40), one manipulator (48) and the other manipulator (49) are reversed to correspond to the takeout means (44) alternately to catch the corresponding tension springs S out of the tension springs S pushed up by the takeout means (44) so as to transfer and mount the tension springs S to the tension spring mounting device.

Figure 9:
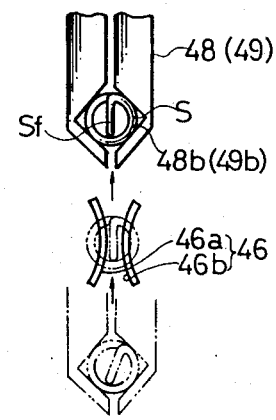
FIG. 9 is an explanatory view to illustrate how the end hook of the tension spring is restricted in the peripheral direction thereof when the tension spring is caught.

Specifically, in order to correspond to the catch by the manipulators (48) and (49), in the illustrated embodiment, as described before, 6 sets of takeout means (44) are arranged and thus 6 tension springs S are to be taken out by these takeout means (44). One manipulator (48) catches the tension springs S that are taken out by the first takeout means (44a), the third takeout means (44c), the fifth takeout means (44e) and the sixth takeout means (44f) respectively corresponding thereto, and then mounts them to a rear frame (1b) in one half section (a left half section in the illustrated embodiment) of the seat frame (1). On the other hand, the other manipulator (49) catches the tension springs S taken out by the sixth takeout means (44f), the fourth takeout means (44d), the second takeout means (44b) and the first takeout means (44a) respectively corresponding to thereto, and then mounts them to a front frame (1a) in the half section of the seat frame (1). In the operation of the transfer device (47), when the tension spring S is caught and lifted up, one end hook Sf of the tension spring S is caused to pass between the two guide wall members (46a) (46b) of a direction restricting means (46) so that the peripheral direction of the tension spring S can be restricted. That is, when the tension spring S is lifted up with the end hook Sf inclined, then the end hook Sf is moved upwardly in sliding contact with the inner surfaces of the guide wall members (46a), (46b), with the result that the tension spring S is rotated in the peripheral direction thereof against the gripping force of the manipulator and thus is rectified into a state in which the tip end of the end hook Sf is allowed to point downward vertically (FIG. 9).

After the tension springs S are mounted to the one half section of the seat frame (1) in the above-mentioned way, also in the other half section of the seat frame (1) the tension springs S are mounted symmetrically. That is, in order to mount the tension springs S in the other half section of the seat frame (1), when the manipulators (48) and (49) catch the tension springs S taken out by the takeout mechanism (44) in the above-mentioned manner, the one manipulator (48) and the other manipulator (49) are reversed, so that the tension springs S caught by the one manipulators (48) are mounted to a front frame (1a) of the other half section of the seat frame (1) and the tension springs S caught by the other manipulators (49) are mounted to a rear frame (1b) of the other half section of the seat frame (1), respectively.

Downstream of the thus constructed tension spring S takeout mechanism and transfer device, that is, in the next stage thereof, there is arranged a tension spring mounting device (60).

Figure 10:
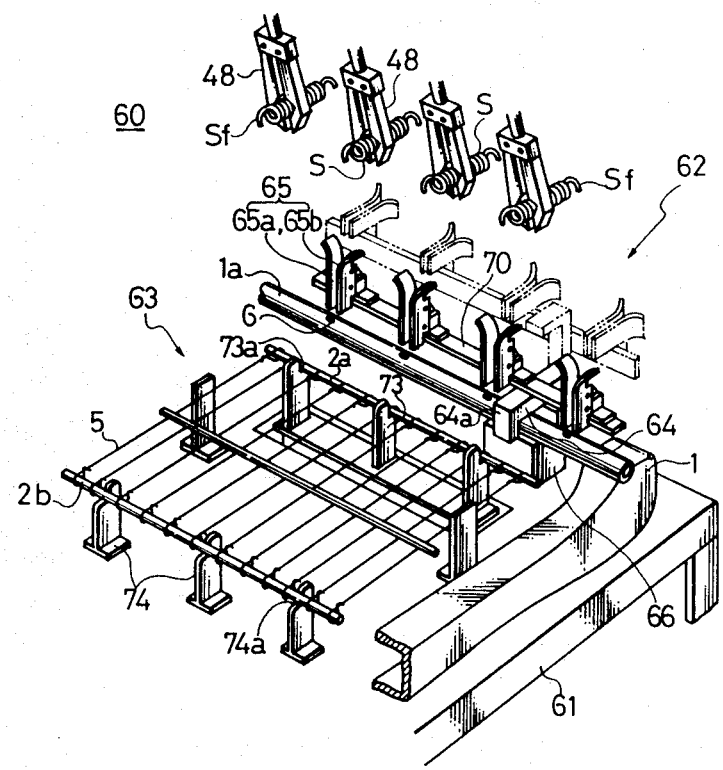
FIG. 10 is a perspective view of a portion of an automatic tension spring mounting device located downstream of the present tension spring takeout device.
Figure 11:
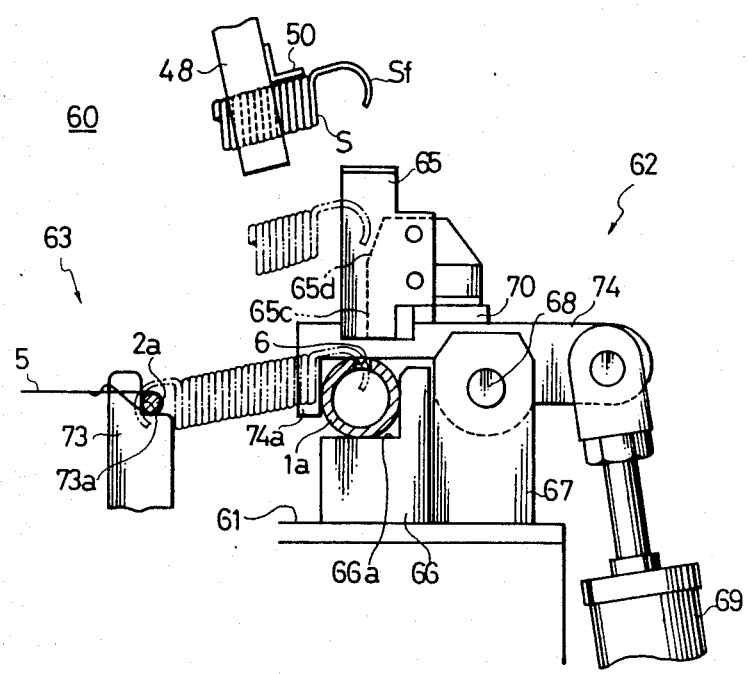
FIG. 11 is a longitudinal side section view of the portion shown in FIG. 10; and, FIG. 12 is an explanatory view to illustrate how the end hook of the tension spring is restricted in the peripheral direction thereof when the tension spring is mounted.
Figure 12:
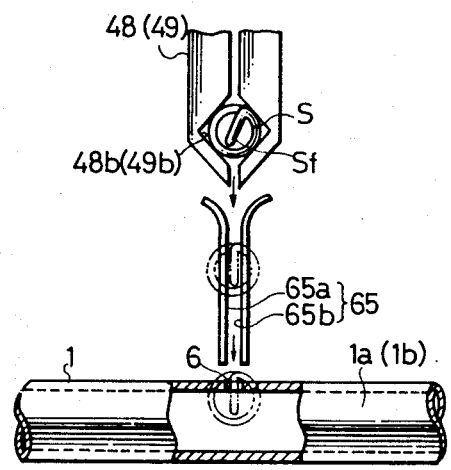

In FIGS. 10, 11 and 12, there are shown the perspective, longitudinal side section and explanatory views of the tension spring mounting device (60). The tension spring mounting device (60) comprises a positioning/guiding mechanism (62) located in the front and rear portions of a mounting bed (61) for fixation of the seat frame (1) to hold the seat frame (1) as well as to guide the tension springs S, and a pad receive member spread mechanism (63) disposed midway of the seat frame mounting bed (61).

The positioning/guide mechanism (62) includes a clamp member (64) for holding the seat frame (1) and guide means (65) for guiding the tension springs S to the seat frame (1). The clamp member (64) is mounted by means of a shaft (68) to a bearing (67) erected outside and correspondingly to a mounting block (66) in the two ends of which the front frame (1a) and rear frame (1b) of the seat frame (1) are placed or mounted respectively, so that the clamp member (64) is allowed to rise and fall as required toward the upper face side of the mounting block (66). The inner end portion of the clamp member (64) is curved in an L-shaped configuration to provide an engagement portion (64a) which in turn cooperates with an engagement stepped surface (66a) formed on the upper surface of the mounting block (66) to define a grasping space portion. Also, the outer end portion of the clamp member (64) is connected to a cylinder (69) provided in the mounting bed (61) so that the outer end portion is allowed to rise and fall by means of operation of the cylinder (69).

There are arranged two such clamp members (64) for the seat frame (1) on the mounting bed (61) in such a manner that they are respectively located correspondingly to the two ends of the front and rear portions of the seat frame (1). Between and to the two clamp members (64) there is fixed a support member (70) which is provided with a plurality of guide means (65) respectively extending in a direction intersecting with the clamp members (64) and located correspondingly to the engagement holes (6) in the seat frame (1).

Each of the guide means (65) comprises a pair of mutually opposing guide wall members (65a) (65b) and an inner wall member (65c). The clearance between the two guide wall members (65a) (65b) is defined slightly greater than the diameter of the tension spring to provide a restricting surface of the tension springs S in the peripheral direction thereof. Also, the inner wall (65c) of the guide means (65) serves as a restricting surface of the tension springs S in the longitudinal direction thereof.

In the positioning/guiding mechanism (62) constructed in this manner, the seat frame (1) is set onto the mounting bed (61), the clamp member (64) is kept in the standup position thereof, and the cylinder (69) is operated after the seat frame (1) is set onto the mounting block (66) of the mounting bed (61). The operation of the cylinder (69) causes the clamp member (64) to rotate and fall downward, so that the front and rear frames (1a) and (1b) of the seat frame (1) are pressed and held by and between the engagement portion (64a) of the clamp member (64) and the engaged stepped surface (66a) of the mounting block (66), that is, are fixedly held therebetween. At the same time, during the standup condition of the clamp member (64), the guide means (65) lying horizontally are made to correspond substantially perpendicularly to the engagement holes (6), respectively, with the rotational movements of the clamp members (64).

The pad receive member spread mechanism (63) includes a plurality of (in the illustrated embodiment, 3) tension arms (73) which are disposed in the front portion of the mounting bed (61) such that they can be moved by cylinders (not shown) in the inward and outward direction of the mounting bed (61), that is, in a direction approaching the front frame (1a) of the seat frame (1) to be mounted and fixed to the mounting bed (61), and a plurality of (in the illustrated embodiment, 3) fixed arms (74) fixed to the rear portion of the mounting bed (61), that is, the portion of the mounting bed (61) adjacent to the rear frame (1b) of the seat frame (1). The respective arms (73) (74) are provided with cutaway engagement portions (73a) (74a) which are located in the outside portions of the tip ends thereof.

In the thus constructed pad receive member spread mechanism (63), in a state in which the tension arms (73) are moved inwardly, the pad receive member (5) is held between the two kinds of arms (73) (74) by bringing the two side members (2a) and (2b) into engagement with the engagement portions (73a) of the tension arms (73) and the engagement portions (74a) of the fixed arms (74), respectively. With this state maintained, the tension arms (73) are moved outwardly by means of operation of the cylinders (not shown) to thereby pull in the side member (2a) of the pad receive member (5) toward the front frame (1a) to make the pad receive member (5) tensioned, while the pad receive member (5) is set at such an interval from the front frame (1a) that the tension springs S can be mounted between the pad receive member (5) and the front frame (1a) of the seat frame (1).

In this manner, the tension springs S can be mounted between the seat frame (1) placed and fixed onto the mounting bed (61) and the pad receive member (5) spread and held in the central portion of the seat frame (1). In order to mount the tension springs S, as described before, the four tension springs S that have been delivered from the horizontal portion (35) of the supply chute (30) by the transfer device (47) are lowered down vertically from above the guide means (65), respectively, the one-side end hooks Sf of the tension springs S are inserted into the enagement holes (6) of the seat frame (1), and the other-side end hooks Sf are engaged with the side members (2a) and (2b) of the pad receive member (5), so that the four tension springs S can be mounted simultaneously.

In this mounting operation, when passing through the guide means (5), the one-side end hooks Sf of the tension springs S are respectively restricted in the peripheral direction thereof between the respective guide walls (65a) (65b) and thus the inclination of these end hooks Sf is rectified, while the respective outer end edges of these end hooks Sf are pressed against the respective inner walls (65c) of the guide means (65) from the inclined portions (65d) thereof to move the tension springs S in the longitudinal direction thereof against the gripping forces of the respective manipulators (48) (49), whereby the longitudinal direction of the each of the tension springs S is restricted or rectified. As a result of this, with the dimensional variations of the individual tension springs S being absorbed, the end hooks Sf of the respective tension springs S can be guided and inserted into the engagement holes (6) in the seat frame (1), respectively.

In this insertion of the end hooks Sf of the tension springs S into the engagement holes (6) in the seat frame (1), as discussed before, since each of the tension springs S is transferred in an inclined manner for mounting, the arc-like curved tip end of the end hook Sf is directed in a direction easy to insert into its associated engagement hole (6), so that the end hook Sf can be inserted into the engagement hole (6) smoothly.

As mentioned above, due to the fact that, in mounting the tension springs S, the end hooks Sf thereof are guided into their associated engagement holes (6) by the guide means (65), respectively, a plurality of tension springs S can be mounted simultaneously and smoothly to thereby reduce the time for mounting thereof.

After the tension springs S are mounted to the seat frame (1) in the above-mentioned manner, the transfer device (47) returns to its initial position and the tension arms (73) of the pad receive member spread mechanism (63) are moved inwardly, thereby removing the tension of the pad receive members (5). As a result of this, the pad receive members (5) are resiliently spread and supported relative to the seat frame (1) only by the tension springs S.

The foregoing operations complete the spreading of the pad receive members (5) to the seat frame (1).

As has been described hereinbefore, according to the tension spring takeout device in a tension spring automatic mounting apparatus according to the invention, since a predetermined number of tension springs can be taken out and mounted to the frame members automatically, the operation time for mounting the tension springs can be reduced greatly when compared with the conventional automatic tension spring mounting apparatus, which enhances the working efficiency remarkably.

What is claimed is:

1. A tension spring takeout device for use in an automatic tension spring mounting apparatus for automatically mounting a predetermined number of tension springs to frame members in a seat frame, said tension spring takeout device comprising:

a stock mechanism for sequentially separating a large number of tension springs from one another, arranging said tension springs in line, and stocking said tension springs therein;

a takeout mechansim including a predetermined number of takeout means located in said stock mechanism so as to correspond to the mounting intervals of said tension springs to said frame members, and operable such that a predetermined number of tension springs can be pushed out simultaneously; and, a transfer device located so as to correspond to a direction in which said takeout mechanism pushes out said tension springs, and operable such that it can catch said tension springs pushed out, transfer said tension springs to the mounting portions of said frame members, and mount said tension springs to said mounting portions of said frame members.

2. A tension spring takeout device for use in an automatic tension spring mounting apparatus as set forth in claim 1, wherein said stock mechanism is a supply chute composed of a pair of rail members with which the two ends of each tension spring can be brought into engagement, said supply chute comprises an inclined portion successively connecting with a part feeder and a horizontal portion successively connecting with said inclined portion, there is provided a delivery device located midway in said inclined portion to drop a predetermined number of tension springs by means of sensing of a sensor, there is provided a cylinder to move said tension springs dropped by said delivery device by means of sensing of an adjacent switch, and said tension springs can be pushed out into said horizontal portion by means of operation of said cylinder.

3. A tension spring takeout device for use in an automatic tension spring mounting apparatus as set forth in claim 1, wherein one of said rail members forming said horizontal portion of said stock mechanism is formed higher and the other is formed lower, whereby said tension springs can be stocked in said stock mechanism in such a manner that they are arranged in line at a predetermined angle of inclination.

4. A tension spring takeout device for use in an automatic tension spring mounting apparatus as set forth in claim 1, wherein there is provided a linear feeder between said stock mechanism and said part feeder, said linear feeder comprises a parallel guide including a pair of rail members, the two ends of each tension spring can be engaged with said parallel guide, and said tension springs can be delivered into said inclined portion of said stock mechanism by means of vibratory movements of said linear feeder.

5. A tension spring takeout device for use in an automatic tension spring mounting apparatus as set forth in claim 1, wherein said takeout mechanism comprises a support member and a plurality of takeout means, said support member is mounted such that it is disposed just below said horizontal portion of said stock mechanism so as to correspond thereto and can be moved vertically by means of a cylinder rod of a cylinder, said support member having a length substantially equal to said horizontal portion and also having a U-shaped section, and said takeout means are composed of a large number of claw-piece-shaped members respectively fixed to said support member at right angles.

6. A tension spring takeout device for use in an automatic tension spring mounting apparatus as set forth in claim 5, wherein each of said takeout means comprises a pair of claw-piece-shaped members located along the inside surfaces of said two rail members of said horizontal portion of said supply chute and also arranged in different levels so as to be able to correspond to said two rail members, and said plural takeout means are mounted at such intervals as correspond to the mounting intervals of said tension springs to said seat frame.

7. A tension spring takeout device for use in an automatic tension spring mounting apparatus as set forth in claim 5, wherein said claw-piece-shaped members in said takeout means are respectively formed in the tip end portions thereof with cutaway inclined recesses and said inclined recesses are formed such that their respective cutaway deepest portions are respectively able to correspond accurately to their associated engagement holes formed in said seat frame.

8. A tension spring takeout device for use in an automatic tension spring mounting apparatus as set forth in claim 1, wherein said horizontal portion of said stock mechanism is provided on the side portion thereof with a plurality of direction restricting means respectively corresponding to said takeout means, each of said direction restricting means comprises a pair of mutually opposing guide wall members providing a clearance portion therebetween, said clearance portion is made to correspond to an inclined recess in each of said takeout means, and said clearance portion is opened both at the upper and lower end portions, and the distance between the central portions of said two guide wall members is defined as slightly greater than the diameter of each of said tension springs.

9. A tension spring takeout device for use in an automatic tension spring mounting apparatus as set forth in claim 1, wherein said transfer device is an industrial robot, said industrial robot is provided on the mutually 180° opposing sides of the tip end portion thereof with a plurality of manipulators respectively located so as to correspond to said mounting intervals of said engagement holes in said seat frame, said plurality of manipulators can be opened and closed simultaneously by means of operation of their associated cylinders, each of said manipulators is provided with grab portions disposed on the insides of said tip end portion thereof for grasping each of said tension springs therebetween, said manipulators are respectively inclined so as to be able to catch said tension springs taken out in an inclined manner in the respective intersecting directions thereof, and each of said manipulators has two grip portions, one grip portion including an L-shaped abutment piece member fixed thereto and located so as to be situated upwardly of said grab portions, and said abutment piece member is used to support the upper-side surface of each of said tension springs when caught by said industrial robot so as to be able to hold said tension spring in the intersecting catch position thereof positively.

10. A tension spring takeout device for use in an automatic tension spring mounting apparatus as set forth in claim 1, wherein said transfer device is operated such that each time said tension springs are taken out by said takeout mechanism one-side manipulators and the other-side manipulators are reversed and made to correspond to said takeout means alternately so that they can catch their corresponding tension springs out of said tension springs pushed up by said takeout means and transfer said tension springs to a tension spring mounting device for mounting them to said seat frame.

11. A tension spring takeout device for use in an automatic tension spring mounting apparatus as set forth in claim 1, wherein downstream of said transfer device there is provided said tension spring mounting device, and said tension spring mounting device comprises a positioning/guiding mechanism disposed in the front and rear portions of a mounting bed for mounting and fixing said seat frame thereto for holding said seat frame as well as for guiding said tension springs, and a pad receive member spread mechanism disposed midway in said mounting bed.

* * * * *